US011131639B2

(12) United States Patent
Mizuno et al.

(10) Patent No.: US 11,131,639 B2
(45) Date of Patent: Sep. 28, 2021

(54) ANALYZER, ANALYSIS SYSTEM, ANALYSIS METHOD AND PROGRAM

(71) Applicant: HORIBA, LTD., Kyoto (JP)

(72) Inventors: Yusuke Mizuno, Kyoto (JP); Tomoki Aoyama, Kyoto (JP); Erika Matsumoto, Kyoto (JP); Shunsuke Murata, Kyoto (JP); Toshiyuki Michikita, Kyoto (JP)

(73) Assignee: HORIBA, LTD., Kyoto (JP)

( * ) Notice: Subject to any disclaimer, the term of this patent is extended or adjusted under 35 U.S.C. 154(b) by 88 days.

(21) Appl. No.: 16/447,497

(22) Filed: Jun. 20, 2019

(65) Prior Publication Data

US 2020/0003711 A1  Jan. 2, 2020

Related U.S. Application Data

(63) Continuation of application No. PCT/JP2017/045698, filed on Dec. 20, 2017.

(30) Foreign Application Priority Data

Dec. 20, 2016  (JP) ................. 2016-247233

(51) Int. Cl.
*G01N 23/223* (2006.01)
*G01T 7/04* (2006.01)

(52) U.S. Cl.
CPC ................. *G01N 23/223* (2013.01)

(58) Field of Classification Search
CPC ............. G01N 1/00; G01N 23/223; G01N 2015/0046; G01N 15/0606; G01N 1/2273;

(Continued)

(56) References Cited

U.S. PATENT DOCUMENTS

| 4,551,848 A | 5/1985 | Greenwood-Smith |
| 7,254,212 B2 | 8/2007 | Saitoh et al. |

(Continued)

FOREIGN PATENT DOCUMENTS

| CN | 1539543 A | 10/2004 |
| CN | 101419208 A | 4/2009 |

(Continued)

OTHER PUBLICATIONS

International Preliminary Report on Patentability for International Application No. PCT/JP2017/045698 dated Jul. 4, 2019.

(Continued)

*Primary Examiner* — Don K Wong
(74) *Attorney, Agent, or Firm* — Brooks Kushman PC

(57) ABSTRACT

To more accurately output a signal related to a source of particulate matter floating in the atmosphere, an analyzer is equipped with a mass concentration measuring unit, an element analysis unit, and a source-related signal output unit. The mass concentration measuring unit measures the mass concentration of fine particulate matter (FP) in the atmosphere. The element analysis unit analyzes an element contained in the FP. The source-related signal output unit outputs a signal related to the source of the FP on the basis of the mass concentration measurement result from the mass concentration measuring unit, and the analysis result for the element contained in the FP from the element analysis unit.

16 Claims, 11 Drawing Sheets

(58) Field of Classification Search
CPC ......... G01N 1/2247; G01N 2015/0288; G01N 1/2202; G01N 2223/651; G01N 2223/076; G01N 2001/2223; G01N 15/06; G01N 15/10; G01N 2015/0042; F01N 2560/02; F01N 2560/05
See application file for complete search history.

(56) References Cited

U.S. PATENT DOCUMENTS

| | | | |
|---|---|---|---|
| 8,012,231 B2 | 9/2011 | Saitoh et al. | |
| 8,119,988 B2 | 2/2012 | Daido et al. | |
| 2013/0035870 A1 | 2/2013 | Feng et al. | |
| 2013/0110400 A1 | 5/2013 | Moshe | |
| 2015/0338357 A1* | 11/2015 | Mizuno | G01T 7/005 378/45 |
| 2015/0338534 A1 | 11/2015 | Mizuno et al. | |

FOREIGN PATENT DOCUMENTS

| | | |
|---|---|---|
| CN | 101680323 A | 3/2010 |
| CN | 105185135 A | 12/2015 |
| CN | 204988955 U | 1/2016 |
| CN | 106092834 A | 11/2016 |
| JP | 2013185939 A | 9/2013 |
| JP | 2013221925 A | 10/2013 |
| JP | 2015219199 A | 12/2015 |

OTHER PUBLICATIONS

International Search Report for International Application No. PCT/JP2017/045698 dated Mar. 20, 2018.
Chinese Office Action dated Jun. 3, 2021, for related Chinese Appln. No. 201780078248.1; 13 Pages.
English Translation of Chinese Office Action dated Jun. 3, 2021, for related Chinese Appln No. 201780078248.1; 15 Pages.
India Office Action dated Aug. 12, 2021, for related India Appln. No. 201917028611; 10 Pages.

* cited by examiner

| Element a | Element b | Element c | Element d | Mass concentration | Determination result |
|---|---|---|---|---|---|
| 52.2296 | 5.3874 | 1.2171 | 41.1572 | 60.0087 | 0.999 |
| 52.4289 | 5.5838 | 1.2412 | 40.2998 | 62.1156 | 0.995 |
| 52.5435 | 5.7863 | 1.2863 | 40.2633 | 63.02 | 1.000 |
| 52.4589 | 5.5838 | 1.2412 | 40.2998 | 59.991 | 0.999 |
| 52.6435 | 5.7853 | 1.2863 | 40.2633 | 58.88 | 1.000 |
| 52.5289 | 5.5838 | 1.2412 | 40.3006 | 60.1102 | 0.999 |
| 52.6432 | 5.7863 | 1.2823 | 40.2633 | 61.2311 | 0.996 |
| 52.4309 | 5.5938 | 1.2412 | 40.2633 | 63.1202 | 0.996 |
| 52.6435 | 5.7863 | 1.2863 | 40.1998 | 62.9802 | 0.996 |
| 52.3289 | 5.5838 | 1.2412 | 40.2633 | 63.01 | 0.991 |
| 52.6435 | 5.3863 | 1.2863 | 40.2998 | 64.001 | 0.996 |
| 52.4289 | 5.5838 | 1.2412 | 40.2998 | 63.1211 | 0.996 |
| 52.4289 | 5.5838 | 1.2412 | 40.2998 | 63.112 | 0.996 |
| 46.0316 | 4.6379 | 2.2785 | 45.7489 | 30.1039 | 0.591 |
| 46.0316 | 4.6379 | 2.2785 | 45.7489 | 32.0039 | 0.591 |
| 45.7956 | 4.6281 | 2.2069 | 45.9394 | 31.004 | 0.579 |
| 46.0316 | 4.6379 | 2.2785 | 45.7489 | 33.0039 | 0.591 |
| 52.4289 | 5.5838 | 1.2412 | 40.2998 | 60.0056 | 0.999 |

FIG. 7

(Annotations: "Steady data" — first row; "Measured data" — subsequent rows; "Measured data deviated from steady data (alarm)" — shaded rows)

ANALYZER, ANALYSIS SYSTEM, ANALYSIS METHOD AND PROGRAM

CROSS-REFERENCE TO RELATED APPLICATIONS

This application is a continuation of PCT Application No. PCT/JP2017/045698 filed Dec. 20, 2017, which claims priority to Japanese Patent Application No. JP2016-247233 filed Dec. 20, 2016, the disclosures of which are hereby incorporated by reference in their entirety herein.

TECHNICAL FIELD

The present disclosure relates to an analyzer for analyzing particulate matter, an analysis system including a plurality of analyzers, and an analysis method thereof.

BACKGROUND

In recent years, particulate matter (e.g. PM2.5) that float in the atmosphere is a large environmental problem. To reduce generation of particulate matter, it is important to identify a source of particulate matter, and for this purpose, a method and an apparatus for estimating a source of particulate matter are developed.

For example, JP-A-2013-221925 discloses a method of estimating a source of dust fall. This source estimation method calculates contribution ratios of analysis data measured in advance of dust fall from a plurality of sources, which match analysis data of dust fall actually collected at a predetermined measurement point, and thereby to estimate sources (degrees of contribution thereof) of the collected dust fall.

SUMMARY

Technical Problem

In the conventional method described above, a source is estimated only based on the analysis result of components contained in the particulate matter or based on an amount of particulate matter in the atmosphere (i.e., concentration of particulate matter). In this case, if the estimation is based on only the concentration of particulate matter in the atmosphere, for example, even if the collected particulate matter is substantially harmless (such as particulate matter generated by open burning), a false alarm may occur indicating that high concentration particulate matter is generated from a risky source, only because of high concentration of the collected particulate matters.

On the other hand, if the source estimation is performed only based on the analysis result of components contained in the particulate matters, because an element estimated to be contained in the particulate matter is usually selected as an analysis subject in advance, there is a case where a source of the particulate matter cannot be estimated if an element different from the selected one is contained in the collected particulate matter, for example.

Various embodiments disclosed herein may more accurately output a signal related to a source of particulate matters floating in the atmosphere.

Technical Solution

A plurality of aspects are described below as means to solve the problem. These aspects can be arbitrarily combined as necessary.

An analyzer according to one aspect of the present invention comprises a mass concentration measuring unit, an element analysis unit, and a source-related signal output unit. The mass concentration measuring unit measures mass concentration of particulate matter. The element analysis unit analyzes an element contained in the particulate matter. The source-related signal output unit outputs a signal related to a source of particulate matter, based on mass concentration measurement result by the mass concentration measuring unit and analysis result by the element analysis unit about the element contained in particulate matter. "Mass concentration measurement result by the mass concentration measuring unit" means a mass concentration that is outputted, calculated, or obtained by the mass concentration measuring unit. "Analysis result by the element analysis unit about the element contained in particulate matter" means an element (or elements) contained in particulate matter that is outputted or obtained as a result of the analysis by the element analysis unit.

In this way, a signal related to a source of particulate matter can be more accurately output, based on information of mass concentration of the particulate matter and element analysis result.

The analyzer may further include a storage unit. The storage unit stores correlation data indicating a correlation between the element contained in the particulate matter and the mass concentration of the particulate matter. In this case, the source-related signal output unit outputs the signal related to a source of particulate matter, based on the correlation data, the element analysis result, and mass concentration measurement result.

In this way, it is possible to more easily output a signal related to a source of particulate matter without complicated calculation or the like.

The correlation data may further include wind direction data related to a correlation between the element contained in the particulate matter and/or the mass concentration of the particulate matter and the wind direction. In this case, the source-related signal output unit may output the signal related to a source of the particulate matter based on the wind direction data.

In this way, it is possible to estimate which direction the particulate matter comes from and reaches the analyzer, so that the signal related to the source can be output more easily.

The analyzer may obtain phenomenon occurrence information and set measurement conditions and/or analysis algorithm based on the obtained phenomenon occurrence information. The phenomenon occurrence information is information related to an occurred phenomenon. In this way, the analyzer can analyze the particulate matter with measurement conditions and/or analysis algorithm optimal for the particulate matter generated from the phenomenon indicated in the phenomenon occurrence information.

The analyzer may further include an element selection unit. The element selection unit selects an element to be analyzed by the element analysis unit. In this way, the element analysis unit can specify the element to be analyzed.

When determining that a currently selected element is not contained in the particulate matter, the element selection unit may select an element different from the currently selected element, as the element to be analyzed.

In this way, if the element to be an analysis subject cannot be specified, a different element can be set as an analysis subject.

The element analysis unit may analyze the element contained in the particulate matter based on comparison between a measured profile and a reference profile. The measured profile indicates a relationship between energy of fluorescent X-rays generated from the particulate matter and intensity of the same. The reference profile indicates a relationship between energy of the fluorescent X-rays generated from source-specified particulate matter whose source is specified and intensity of the same.

In this way, the element contained in the particulate matter can be analyzed more accurately.

The source-related signal output unit may compare steady data related to the element contained in the particulate matter and mass concentration in a steady state with measured data of the element analysis result and the mass concentration, and if it is determined that the measured data is not similar to the steady data, the source-related signal output unit may output a signal for alarm as the signal related to a source of particulate matter.

In this way, it is possible to notify that a state different from a normal state has occurred in the measured data obtained by the analyzer.

The analyzer may include a collection filter and a collection unit. The collection filter has a collection area capable of collecting the particulate matter, and moves in the length direction so that the collection area is moved from a first position to a second position. The collection unit is disposed corresponding to the first position, so as to allow the collection area at the first position to collect the particulate matter.

In this case, the mass concentration measuring unit measures mass concentration of the particulate matter collected in the collection area at the first position. In addition, the element analysis unit analyzes the element contained in the particulate matter collected in the collection area after moving from the first position to the second position.

In this way, the mass concentration measurement and the element analysis of the particulate matter are performed every predetermined period, and the signal related to a source of particulate matter can be output every predetermined period.

An analysis system according to another aspect of the present invention includes the analyzer and a server. The server can communicate with the analyzer and an external device. The server and/or a control unit of the analyzer obtain phenomenon occurrence information, and set measurement conditions and/or analysis algorithm of the analyzer based on the obtained phenomenon occurrence information.

In this way, the analyzer can analyze the particulate matter with the measurement conditions and/or the analysis algorithm optimal for the particulate matter generated from the phenomenon indicated in the phenomenon occurrence information.

An analysis system according to another aspect of the present invention includes a plurality of analyzers described above.

An analysis method according to still another aspect of the present invention includes the steps of measuring mass concentration of particulate matter; analyzing an element contained in the particulate matter; and outputting a signal related to a source of particulate matter, based on a mass concentration measurement result and an element analysis result about the element contained in the particulate matter.

In this way, the signal related to a source of particulate matter can be output more accurately, based on information, i.e. the mass concentration of the particulate matter and the element analysis result thereof.

A program according to still another aspect of the present invention is a program for allowing a computer to execute the analysis method described above.

Advantageous Effects

A source of particulate matter can be estimated more accurately, based on information, i.e. the mass concentration of the particulate matter and the element analysis result thereof.

BRIEF DESCRIPTION OF THE DRAWINGS

FIG. 7 is a table showing one example of steady data and measured data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

1. First Embodiment (1) Overview of Analyzer

An analyzer 100 according to a first embodiment is described below. The analyzer 100 according to the first embodiment is an apparatus that outputs a signal related to a source of particulate matter (e.g. a signal for alarm). Therefore, the analyzer 100 is disposed at a source of dangerous particulate matter or its vicinity, for example. For instance, it is disposed along a heavy traffic road (a main road, a highway, and etc.) or its vicinity, or in an industrial area that may generate particulate matter or its vicinity.

(2) Structure of Analyzer

Figure 1:
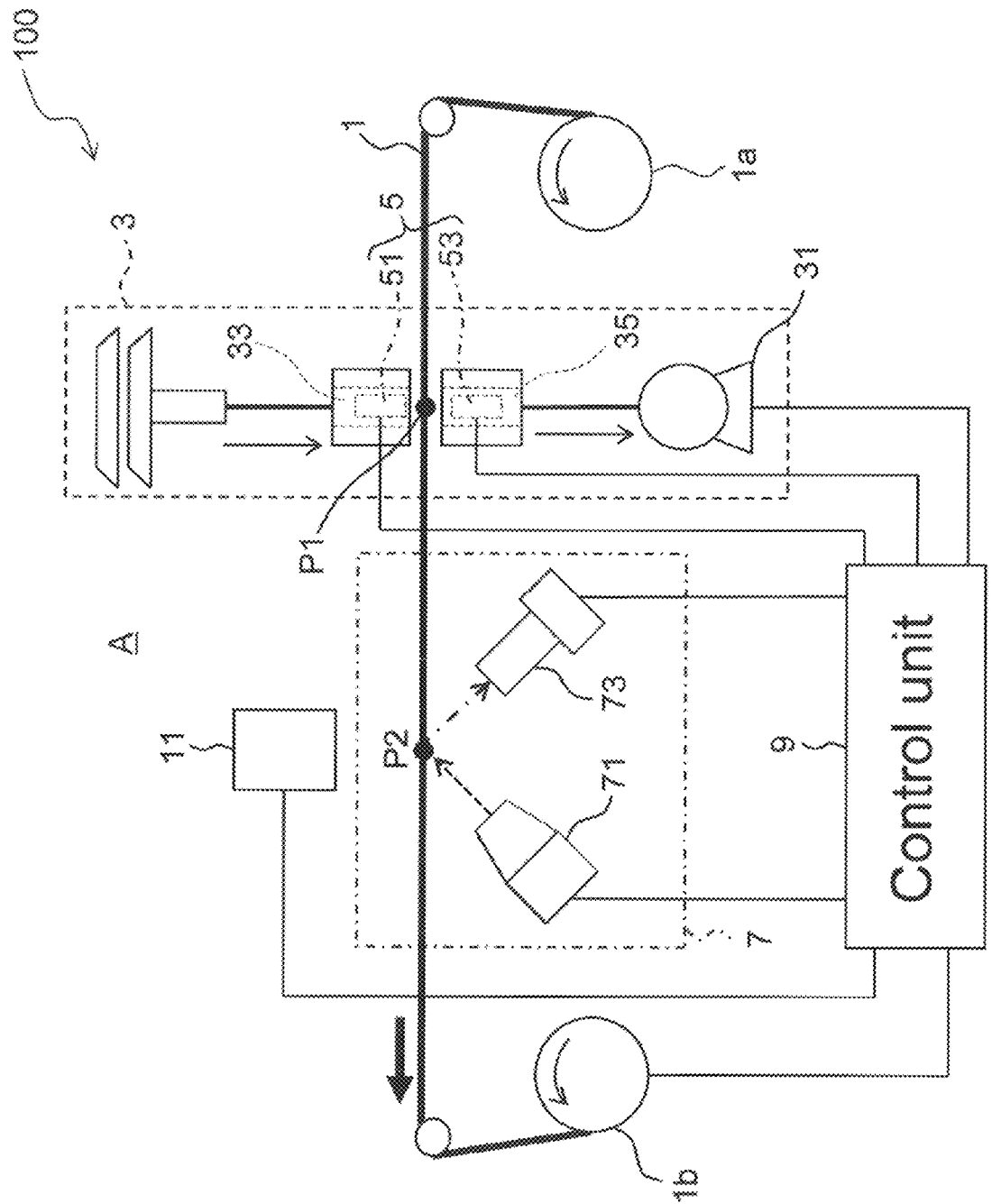
FIG. 1 is a diagram showing a structure of an analyzer.

Next, a structure of the analyzer 100 according to the first embodiment is described with reference to FIG. 1. FIG. 1 is a diagram showing a structure of the analyzer.

The analyzer 100 includes a collection filter 1. The collection filter 1 is a tape-like member having a reinforcement layer made of nonwoven fabric of a polymeric material (such as polyethylene), for example, and a collection layer (also referred to as a collection area) formed and laminated on the reinforcement layer. The collection layer is made of a porous fluorocarbon resin material having pores that can collect fine particulate matter FP (e.g. particulate matter having a particle diameter of 2.5 µm or less) (one example of the particulate matter). As the collection filter 1, for example, a one-layer glass filter, a one-layer fluorocarbon resin material filter, or other filters can be used.

For instance, the collection filter 1 is sent out from a sending-out reel 1a and is wound up by a winding reel 1b when it rotates, so that the collection filter 1 can move in the length direction (the direction shown by a thick arrow in FIG. 1).

For instance, if it is necessary to regularly measure vanadium (V) and/or chromium (Cr), it is possible to use the collection filter 1 having a metal thin film such as an aluminum thin film or a titanium thin film formed on the surface. Using the metal thin film, the background of an element to be measured can be reduced.

The analyzer 100 includes a collection unit 3. The collection unit 3 is disposed corresponding to a first position P1 in the length direction of the collection filter 1. For instance, the collection unit 3 collects fine particulate matter FP contained in the air A on the collection area of the collection filter 1, by sucking the air A by a suction force at a suction port 35 connected to a suction pump 31, and blowing the sucked air A from a discharge port 33 to the collection area of the collection filter 1 at the first position P1.

The analyzer 100 includes a collection amount measuring unit 5, which has a β-ray source 51 (e.g. carbon 14 (14C)) disposed at the discharge port 33, and a β-ray detector 53 (e.g. a photomultiplier including a scintillator) disposed to face the β-ray source 51 at the suction port 35.

The β-ray source 51 emits β-rays to a measurement area at the first position P1. The β-ray detector 53 measures intensity of β-rays that have passed through the fine particulate matter FP collected in the collection area at the first position P1.

The analyzer 100 includes an analyzing unit 7 disposed at the position corresponding to a second position P2 in the length direction of the collection filter 1. The analyzing unit 7 includes an X-ray source 71 (e.g. a device for generating X-rays by irradiating metal such as palladium with an electron beam), which emits X-rays to the fine particulate matter FP existing at the second position P2, and a detector 73 (e.g. a silicon semiconductor detector or a silicon drift detector), which detects fluorescent X-rays generated from the fine particulate matter FP.

The analyzer 100 includes a control unit 9. The control unit 9 is a computer system including a central processing unit (CPU), a storage device such as a RAM and a ROM, a display 97 (such as a liquid crystal display) (FIG. 2), and various interfaces. A part or a whole of functions of components of the control unit 9 described below may be realized by a program that can be executed by the computer system and is stored in the storage device.

Figure 2:
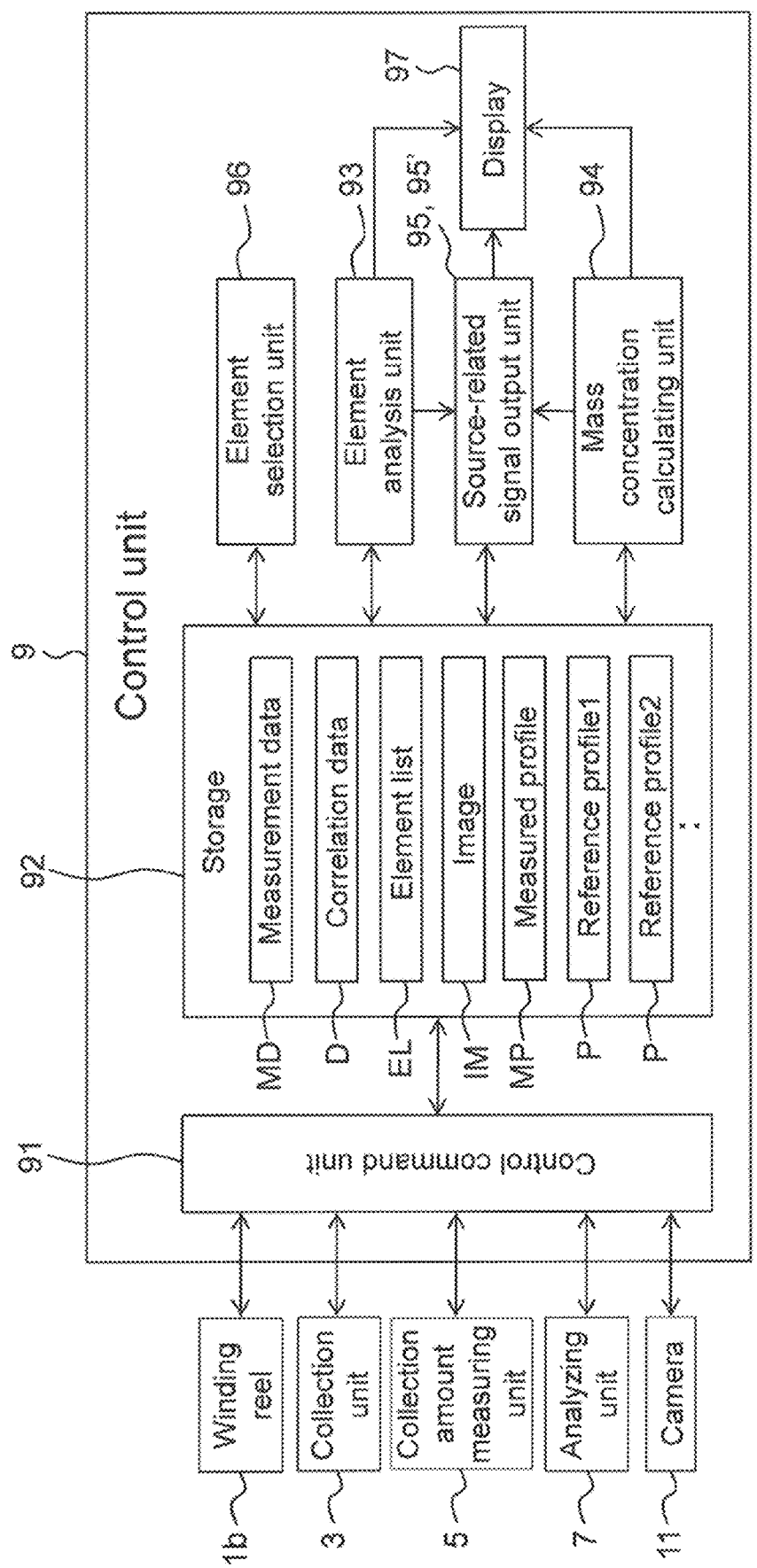
FIG. 2 is a diagram showing a structure of a control unit.

Specifically, as shown in FIG. 2, the control unit 9 includes a control command unit 91, a storage unit 92, an element analysis unit 93, a mass concentration calculating unit 94, a source-related signal output unit 95, an element selection unit 96, and the display 97 described above. The control command unit 91 controls the winding reel 1b, the collection unit 3, the collection amount measuring unit 5, the analyzing unit 7, and a camera 11. In addition, the control command unit 91 receives signals output from the collection amount measuring unit 5, the analyzing unit 7, and the camera 11, so as to convert the signals into appropriate data formats, and stores them in the storage unit 92.

The storage unit 92 is one part of the storage area of the computer system constituting the control unit 9, and stores various data necessary for the analyzer 100.

The element analysis unit 93 analyzes an element contained in the fine particulate matter FP collected in the collection area at the second position P2. The mass concentration calculating unit 94 calculates a collection amount of the fine particulate matter FP in the collection area at the first position P1. This mass concentration calculating unit 94 and the collection amount measuring unit 5 described above constitute a "mass concentration measuring unit".

The source-related signal output unit 95 outputs to the display 97, for example, a signal related to a source of fine particulate matter FP, based on an analysis result of the element contained in the fine particulate matter FP by the element analysis unit 93 and mass concentration calculation result by the mass concentration calculating unit 94.

As one embodiment, the source-related signal output unit 95 may output the signal related to a source of fine particulate matter FP to a control circuit of an alarm lamp or an alarm sound generator, or the like. In this way, if dangerous fine particulate matter FP is generated, it is possible to turn on the alarm lamp or output alarm sound. Alternatively, the source-related signal output unit 95 may notify a notification (e.g. alarm) related to the source to a device connected to the analyzer 100 via a network.

The control unit 9 includes the element selection unit 96. The element selection unit 96 selects an element to be analyzed by the element analysis unit 93. For instance, the element selection unit 96 controls the display 97 to display a periodic table in which a part corresponding to each element can be turned on or off, and a user can turn on a part of the element to be analyzed (and turn off the element to be excluded from the analysis), so that an element to be an analysis subject can be selected. The elements selected by the user are stored as an element list EL in the storage unit 92.

Other than that, the element selection unit 96 may display a list of elements determined in advance so that the element contained in the list can be selected.

The control unit 9 may be constituted of a plurality of computer systems. For instance, one computer system may be disposed in the analyzer 100 so that the computer system controls the analyzer 100. On the other hand, another computer system (e.g. a mobile terminal such as a tablet terminal) may communicate with the computer system or the like disposed in the analyzer 100 so as to send a control instruction to the analyzer 100. In addition, the another computer system may have a function capable of performing analysis using data obtained from the analyzer 100. In this way, operations of the analyzer 100, and/or analysis using data obtained from the analyzer 100 can be performed at a site distant from the analyzer 100.

The analyzer 100 includes the camera 11 disposed at a position corresponding to the second position P2 and opposite to the X-ray source 71 and the detector 73 with respect to the collection filter 1. For instance, the camera 11 is a CMOS image sensor, which takes an image of the fine particulate matter FP collected in the collection area at the second position P2, and outputs data of a taken image IM to the control unit 9.

(3) Analysis Operation of Fine Particulate Matter by Analyzer

Next, an analysis operation of fine particulate matter FP using the analyzer 100 according to the first embodiment is described. In the following description, the analysis operation of estimating a source of fine particulate matter FP is described with reference to a flowchart of FIG. 3.

Before starting the analysis by the analyzer 100, various data necessary for analyzing an element contained in the fine particulate matter FP collected by the element analysis unit 93 are obtained (Step S1).

As one embodiment, for example, the fine particulate matter FP collected from (a plurality of) facilities that are sources of the fine particulate matter FP near the analyzer 100 is regarded as source-specified particulate matter, and data obtained by measuring fluorescent X-ray profile of the fine particulate matter FP using the analyzer 100 can be stored as a reference profile P in the storage unit 92.

As one embodiment, source-known particulate standard substance (such as yellow sand standard substance, car exhaust standard substance, brake dust standard substance, oil burning dust standard substance, or waste burning dust standard substance) is regarded as the source-specified particulate matter, and data obtained by measuring the fluorescent X-ray profile of the standard substance using the analyzer 100 can be stored as the reference profile P in the storage unit 92.

Further, both the fluorescent X-ray profile of the standard substance and the fluorescent X-ray profile of the fine particulate matter FP generated actually from the facility may be stored as the reference profile P in the storage unit 92.

Other than that, it may be possible to measure the fluorescent X-ray profile collected from the standard substance or the facility multiple times, and to regard an average value of the plurality of the measured fluorescent X-ray profiles as the reference profile P.

Alternatively, instead of actually measuring the fluorescent X-ray profile by the analyzer 100, it may be possible to obtain the fluorescent X-ray profile of the substance having a known composition from a database of the fluorescent X-ray profile, and to store the fluorescent X-ray profile as the reference profile P in the storage unit 92.

In addition, it may be possible to analyze the obtained reference profile P so as to specify an element contained in the corresponding fine particulate matter FP and/or the standard substance, and to associate the result of specifying the element with the element list EL indicating the element selected by the user.

In this way, for example, when the user selects the element to be analyzed using the element selection unit 96, it is possible to limit in advance the reference profile P to be fit with the fluorescent X-ray profile (measured profile MP) of the collected fine particulate matter FP.

In addition, in this embodiment, correlation data D is obtained and stored in the storage unit 92. The correlation data D indicates correlation among the element contained in the fine particulate matter FP, the mass concentration of the fine particulate matter FP, and/or wind direction data. The correlation data D can be obtained as follows, for example.

First, the analyzer 100 performs the collection of the fine particulate matter FP, the measurement of mass concentration of the fine particulate matter FP, and the analysis of the element contained in the fine particulate matter FP, every predetermined time. The wind direction during performing the collection, the measurement of the mass concentration, and the analysis of the element, is measured using an anemoscope (not shown) disposed in the analyzer 100 or at its vicinity.

It is preferred to perform the collection, the measurement of the mass concentration, the analysis of the element, and the measurement of the wind direction described above, repeatedly for a long period, and to collect many data to generate meaningful correlation data D.

Figure 4:
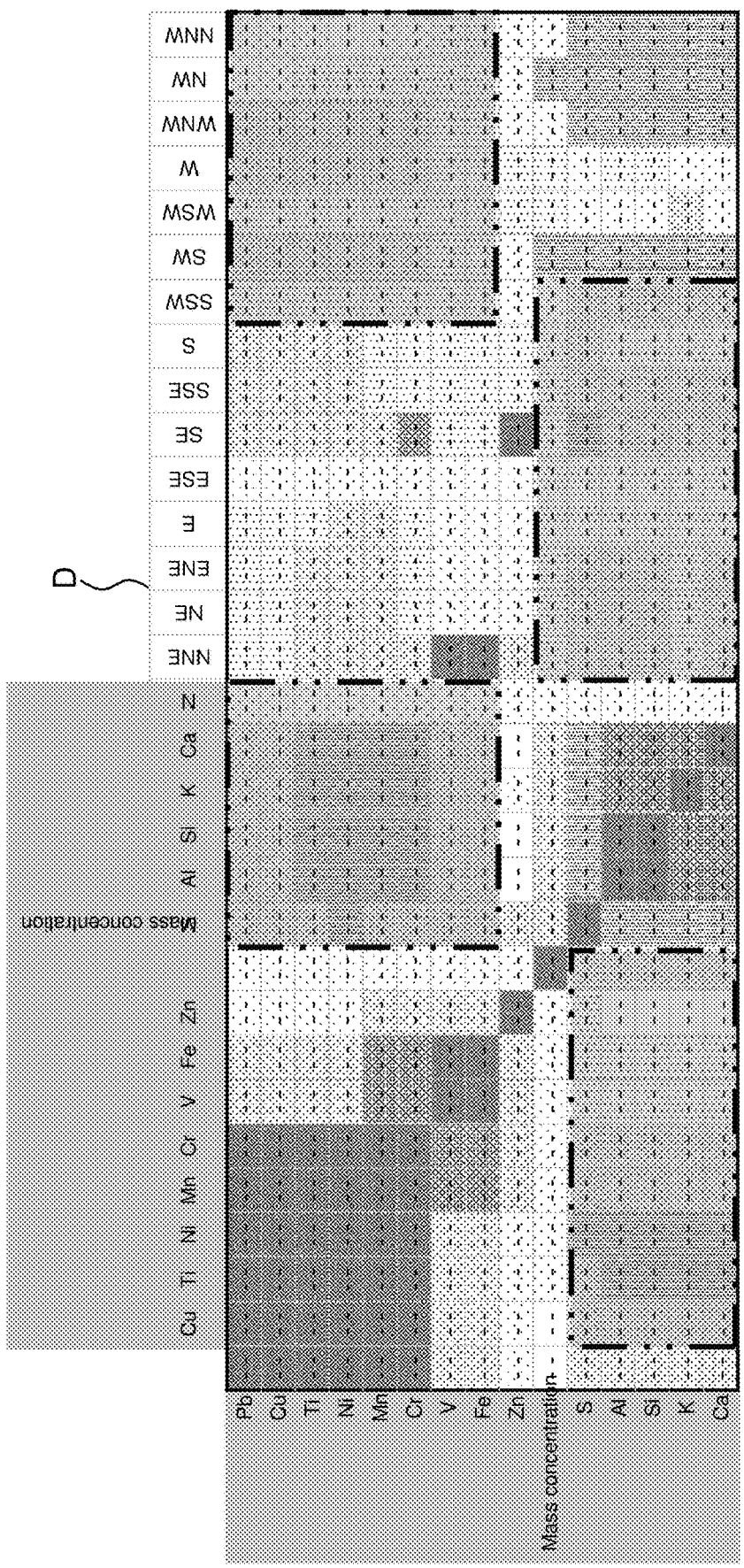
FIG. 4 is a table showing one example of correlation data.

Next, using the collected data, a correlation coefficient for two parameters among each elements specified by the element analysis, the mass concentration, and the wind direction is calculated for every combination of the two parameters. Then, each of the calculated correlation coefficients is inserted at corresponding position in a table (matrix) as shown in FIG. 4, in which the elements and the mass concentration are arranged in a row direction while the elements, the mass concentration and the wind direction are arranged in a column direction, for example, and hence the complete correlation data D as shown in FIG. 4 is generated. FIG. 4 shows an example of the correlation data.

Note that in FIG. 4, the magnitude of the correlation coefficient is indicated by density of color of each component of the correlation data shown in the table (matrix) (as the correlation coefficient is larger, the density is higher). In addition, in the correlation data D of FIG. 4, negative correlation coefficients are calculated in areas surrounded by double-dot-dashed lines.

After obtaining the various data described above and performing zero calibration and/or span calibration as necessary, and before starting the analysis by the analyzer 100, the element selection unit 96 allows the user to select elements to be analyzed, and the selected elements are stored as the element list EL in the storage unit 92 (Step S2).

For instance, an element contained in the fine particulate matter FP generated from a particular source is selected as the element to be analyzed, and hence the generation status of the fine particulate matter FP from the particular source can be monitored.

After that, the analyzer 100 starts the analysis. Specifically, the control command unit 91 controls the collection unit 3 to collect the fine particulate matter FP in the collection area at the first position P1 (Step S3).

While the fine particulate matter FP is being collected, the control command unit 91 controls the β-ray source 51 to emit β-rays to the first position P1, a β-ray detection signal indicating intensity of β-rays is fetched as measurement data MD from the β-ray detector 53 and is stored in the storage unit 92. The mass concentration calculating unit 94 calculates the collection amount of the fine particulate matter FP in the collection area at the first position P1 based on magnitude of the β-ray detection signal.

When a predetermined time (e.g. one hour) elapses after the start of collection ("Yes" in Step S4), the control command unit 91 commands the collection unit 3 to stop the collection of fine particulate matter FP.

After the collection of fine particulate matter FP is stopped, the mass concentration calculating unit 94 calculates the mass concentration of the fine particulate matter FP collected in the collection area at the first position P1, based on the collection amount of the fine particulate matter FP at the timing when the collection is stopped (Step S5).

After the mass concentration is calculated, the winding reel 1b is rotated so that the collection area at the first position P1 is moved to the second position P2, and then the control command unit 91 allows the X-ray source 71 to emit X-rays to the second position P2. In addition, the control command unit 91 allows the detector 73 to detect a pulse signal corresponding to intensity of fluorescent X-rays generated from the fine particulate matter FP collected in the collection area at the second position P2, and the pulse signal is fetched as the measurement data MD and is stored in the storage unit 92.

After obtaining the pulse signal, the element analysis unit 93 generates the fluorescent X-ray profile, which indicates a relationship between the energy of the fluorescent X-rays and the intensity of the same (the number of pulses of the pulse signal at corresponding energy), as the measured profile MP from the obtained pulse signal, and stores it in the storage unit 92 (Step S6).

Then, the element analysis unit 93 compares the obtained measured profile MP with a plurality of reference profiles P stored in the storage unit 92, so as to specify the element contained in the fine particulate matter FP collected in Step S3 (Step S7).

For instance, data fitting between the reference profile P stored in the storage unit 92 and the measured profile MP is performed based on these profiles, using a least squares method, a maximum likelihood method, or the like, and it is determined that the element contained in the reference profile P that mostly matches the measured profile MP is contained also in the collected fine particulate matter FP.

In this embodiment, because the element to be analyzed by the element analysis unit 93 is selected in Step S2, the element can be analyzed more quickly in Step S7.

Note that if it is determined that the measured profile MP mostly matches the reference profile P whose peak position does not match with that of the measured profile MP while the square of difference between them is minimum, and if there is another reference profile P whose peak position matches with that of the measured profile MP in which square of difference between them is relatively small, it may be determined that this another reference profile P mostly matches the measured profile MP.

If the reference profile P that mostly matches the measured profile MP is determined, the element analysis unit 93 can specify that the element contained in the source-specified particulate matter from which the mostly-matched reference profile P is obtained is contained in the fine particulate matter FP from which the measured profile MP is obtained.

As described above, because each reference profile P stored in the storage unit 92 is associated with corresponding source-specified particulate matter, the source of the collected fine particulate matter FP can be estimated based on the fitting result between the measured profile MP and the reference profile P.

In addition, the element analysis unit 93 can calculate composition ratio of the elements contained in the collected fine particulate matter FP, based on a ratio between the calculated element concentration and each peak of the measured profile MP.

After performing the element analysis, the control command unit 91 obtains an image of the collected fine particulate matter FP using the camera 11 and stores the image in the storage unit 92. In addition, the control command unit 91 may control the display 97 to display the image IM.

After obtaining the image of the fine particulate matter FP, the source-related signal output unit 95 estimates the source of the collected fine particulate matter FP based on the calculated mass concentration and the element analysis result (Step S8).

For instance, if tendency of the increase or decrease of the calculated mass concentration is the same as tendency of the increase or decrease of the content of the element selected by the element selection unit 96 (e.g. the content of the selected element increases as the mass concentration increases), the source-related signal output unit 95 can estimate that the collected fine particulate matter FP is generated from the particular source that generates the fine particulate matter FP containing the selected element. In this case, the source-related signal output unit 95 can display on the display 97 that the collected fine particulate matter FP is generated from the selected particular source.

On the other hand, if the tendency of the increase or decrease of the mass concentration is different from the that of the content of the selected element (e.g. if the content of the selected element is not increased despite that the mass concentration is increased), the source-related signal output unit 95 can estimate that the collected fine particulate matter FP is generated from a source other than the particular source that generates the fine particulate matter FP containing the selected element.

In this case, the source-related signal output unit 95 can display on the display 97 that the collected fine particulate matter FP is generated from a source different from the selected particular source, for example. Alternatively, the source-related signal output unit 95 may notify the above fact to another apparatus or the like connected thereto via the network.

In this way, for example, the user can use the element selection unit 96 to select the element different from the currently selected element, as the element to be analyzed.

In one embodiment, the source-related signal output unit 95 may further analyze the image IM of the fine particulate matter FP, so as to estimate the source of the collected fine particulate matter FP based on ratio of colors contained in the image IM. For instance, if yellow color is largely contained in the image IM, it can be estimated that a main source of the fine particulate matter FP is a yellow sand source.

Other than that, if white color (gray color) is largely contained, it can be specified that an open burning site, or a cement powder generation site such as a cement factory or a building demolition site is the source. In addition, if black color is largely contained, it can be specified that a fuel (such as oil or coal) burning site is the source. Further, if red or brown color (reddish color) is largely contained, it can be specified that a copper and/or iron (oxide) generation site is the source.

In one embodiment, the source-related signal output unit 95 may estimate the source of fine particulate matter FP based on a shape of the fine particulate matter FP obtained by the analysis of the image IM. For instance, if the shape has many bumps and dips, it can be estimated that the collected fine particulate matter FP has been generated from a soil and/or cement powder generation site.

In one embodiment, for example, in the case where the mass concentration of the collected fine particulate matter FP is increased while the content of the selected element is not increased, or in other cases, the element selection unit 96 may select an element different from the currently selected element as the element to be analyzed, based on information related to color contained in the image IM received from the source-related signal output unit 95.

For instance, if information indicating that black color is largely contained in the image IM is received, it is estimated that a fuel burning site is the source, and hence vanadium (V) can be the analysis subject. If information indicating that reddish color is largely contained is received, copper (Cu) and iron (Fe) can be the analysis subjects. If information indicating that white color (gray color) or yellow color is largely contained is received, calcium (Ca), aluminum (Al), silicon (Si), potassium (K), or the like contained in open burning ash, yellow sand, soil, and/or cement can be the analysis subjects.

Figure 5:
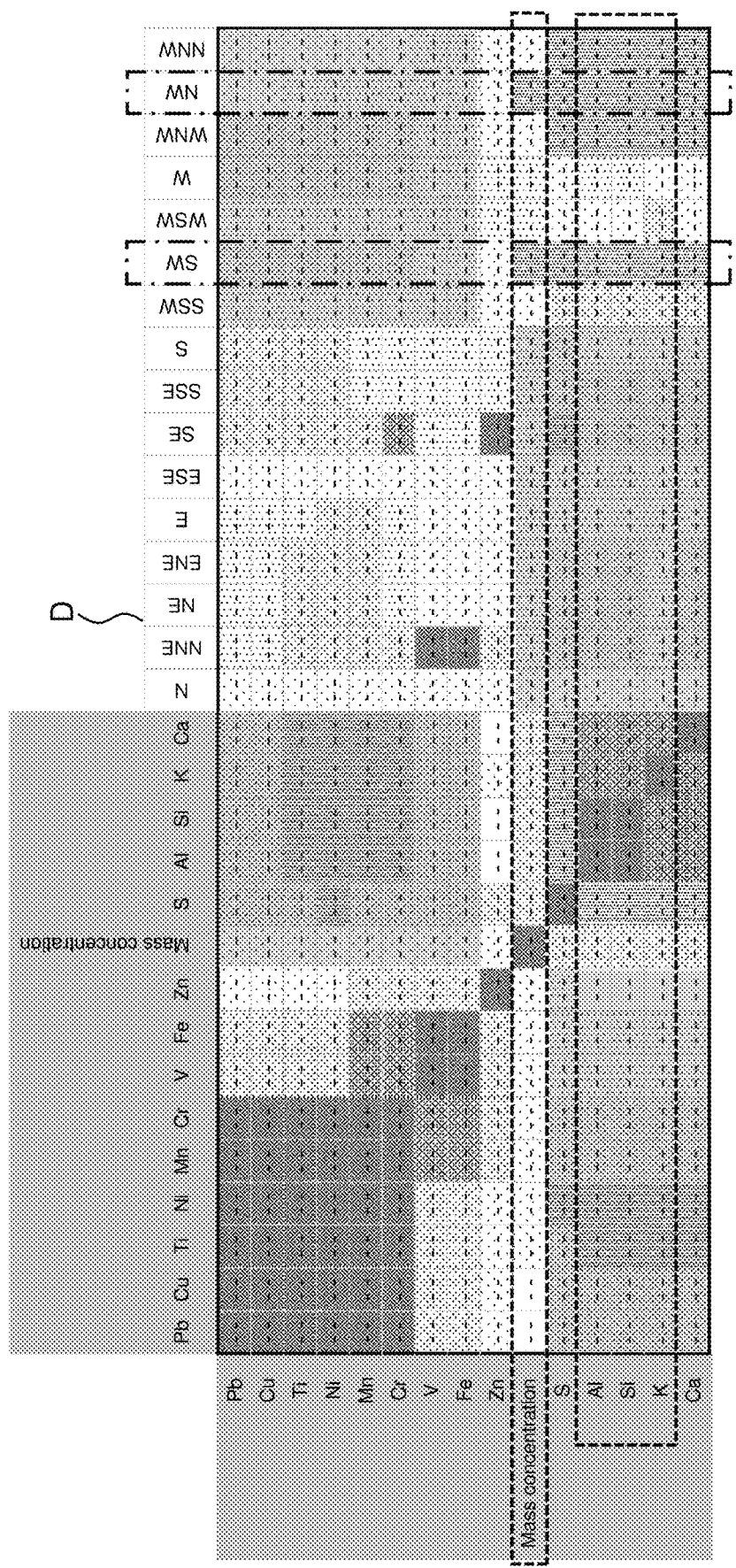
FIG. 5 is a table showing another example of a source estimation method based on an element analysis result, mass concentration, and correlation data.

In one embodiment, the source-related signal output unit 95 may further estimate the source of the collected fine particulate matter FP using the correlation data D stored in the storage unit 92. For instance, a case is considered where contents of aluminum (Al), silicon (Si), and potassium (K) are increased as a result of the element analysis, and the mass concentration is also increased. In this case, in the example of the correlation data D shown in FIG. 4, the wind direction having large correlation coefficients with these elements and a large correlation coefficient with the mass concentration is southwest or northwest as shown in FIG. 5, which is the wind direction in which the area surrounded by broken lines and the area surrounded by dot-dashed lines are overlapped with each other in FIG. 5. Therefore, in the case described above, the source-related signal output unit 95 can estimate that the collected fine particulate matter FP has come from southwest or northwest of the position where the analyzer 100 is disposed.

FIG. 5 shows an example of an estimation method of a source based on the element analysis result, the mass concentration, and the correlation data.

Executing the Steps S1 to S8 described above so as to estimate the source of fine particulate matter FP, the analyzer 100 can accurately estimate the source of fine particulate matter FP using the mass concentration of the fine particulate matter FP and the element analysis result.

In addition, using the correlation data D, by a relatively simple method such as comparison of the magnitudes of the correlation coefficient among the obtained mass concentration, the element analysis result, and the wind direction, the source of fine particulate matter FP can be easily estimated without a complicated calculation.

Further, by repeating the collection of fine particulate matter FP every predetermined time, and performing the estimation of the source of the collected fine particulate matter FP the every predetermined time, a variation of the source of fine particulate matter FP for every predetermined time can be monitored.

After executing the Steps S1 to S8 described above, until a stop button (not shown) or the like of the analyzer 100 is pressed so as to determine to stop the analyzer 100 (as long as "No" in Step S9), the Steps S1 to S8 described above are repeatedly performed.

2. Second Embodiment

Figure 6A:
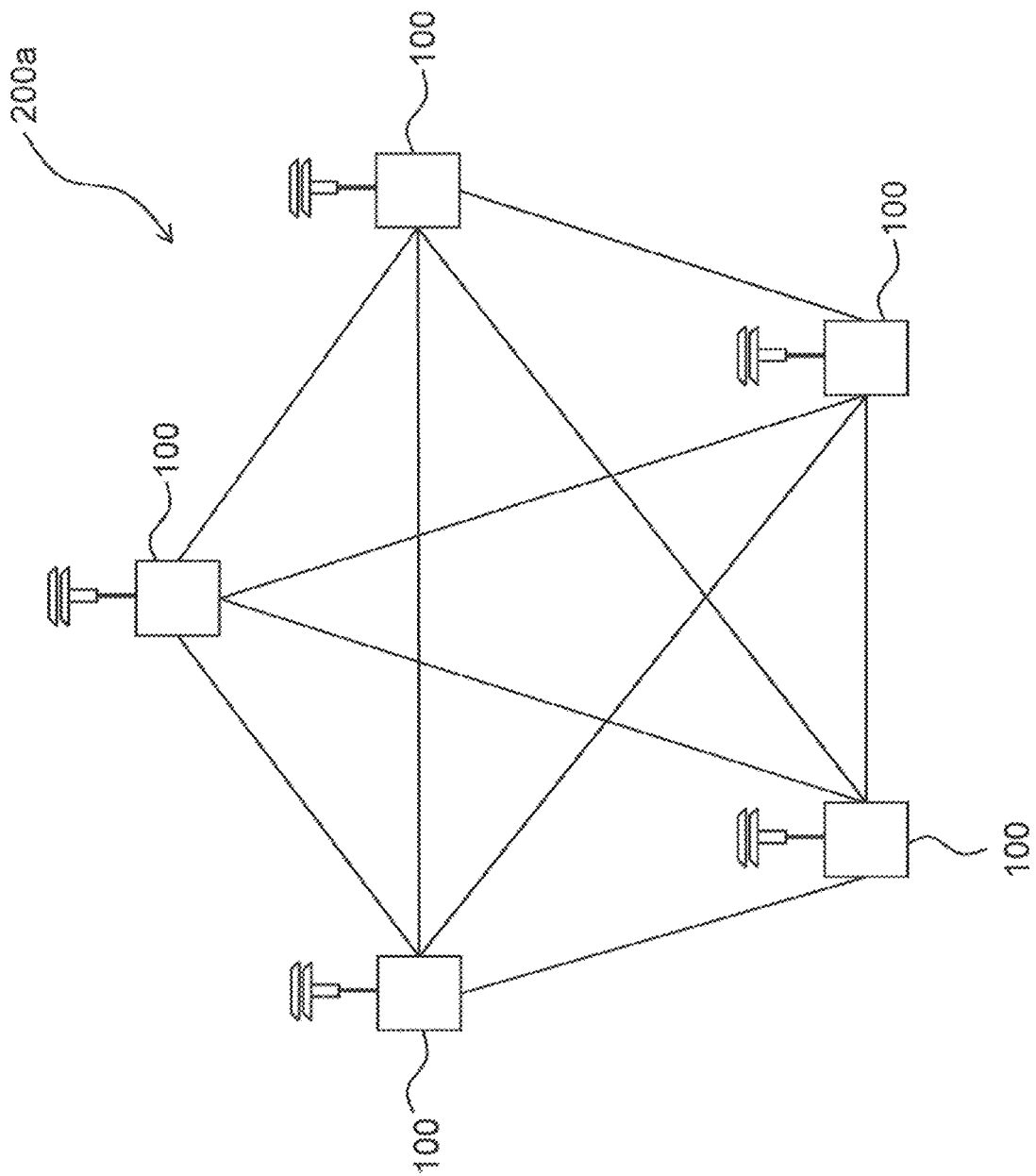
FIG. 6A is a diagram showing one example of a structure of an analysis system according to a second embodiment.

A plurality of analyzers 100 according to the first embodiment may be disposed, for example, along a heavy traffic road, or from a predetermined position in an industrial area to a predetermined position outside the industrial area. As shown in FIG. 6A, the plurality of analyzers 100 may be connected to each other via a network (e.g. a wireless network such as Wi-Fi, a wired wide area communication network (such as an optical communication network, an ISDN network, or a fixed telephone network)), for example, in a communicable manner, so as to form an analysis system 200a. FIG. 6A is a diagram showing an example of a structure of the analysis system according to the second embodiment.

In this way, for example, each of the analyzers 100 can use not only the mass concentration of the fine particulate matter FP and the element analysis result measured by itself, but also the measurement result related to the fine particulate matter FP and/or an output history of the signal related to a source of fine particulate matter FP from other analyzers 100, so as to more correctly output the signal related to a source of fine particulate matter FP.

For instance, if the fine particulate matters FP having substantially the same element composition are detected by the plurality of analyzers 100, by tracing the plurality of analyzers 100 in an descending order of the measurement value of the mass concentration of the fine particulate matter FP (from higher value to a lower value of the mass concentration), a flying route and a flying direction of the fine particulate matter FP can be correctly estimated.

Figure 6B:
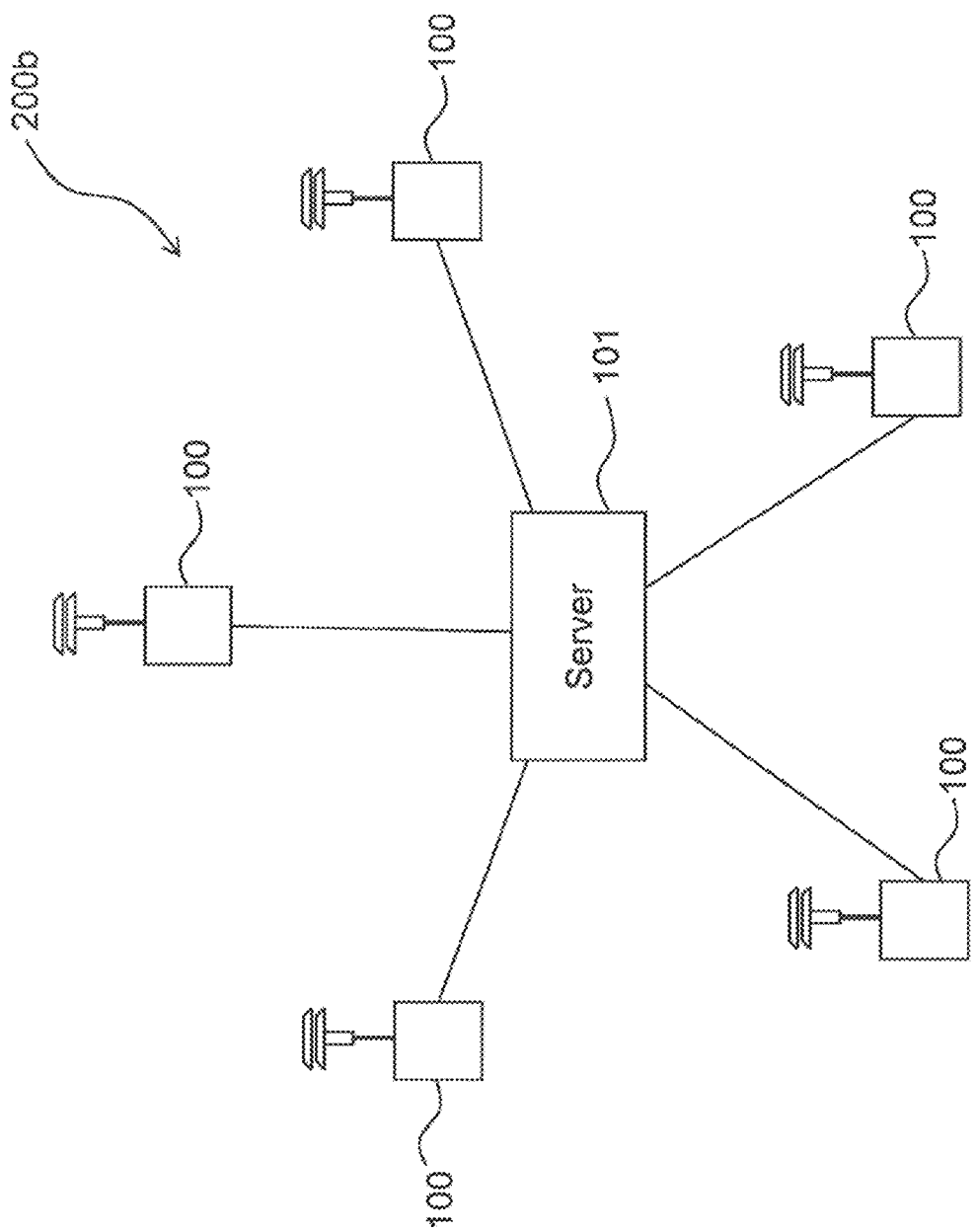
FIG. 6B is a diagram showing another example of a structure of the analysis system according to the second embodiment.

In addition, as shown in FIG. 6B, the plurality of analyzers 100 may be connected to a server 101 that collects the mass concentration, the element analysis result, and/or the output history of the signal related to a source of fine particulate matter FP, and the like, obtained by the plurality of analyzers 100. In this case, the plurality of analyzers 100 and the server 101 forms an analysis system 200b. FIG. 6B is a diagram showing another example of a structure of the analysis system according to the second embodiment.

In this case, for example, the server 101 may determine whether or not to output the signal related to a source of particulate matter, based on the collected information. Alternatively, for example, each analyzer 100 may downloads data of other analyzers 100 from the server 101, so that the analyzer 100 also uses the downloaded data for outputting the signal related to a source of particulate matter.

The analysis systems 200a and 200b described above may include not only the analyzer 100 but also another type of analyzer capable of measuring other than the mass concentration and the element analysis. For instance, it may include a gas analyzer that analyzes a gas (or a gaseous substance) contained in the air A. In addition, the measurement data obtained by the gas analyzer may be included in the correlation data D described above. This gas analyzer performs the analysis of a gas such as hydrocarbon, carbon monoxide (CO), carbon dioxide (CO2), nitrogen oxide (NOx), ozone (O3), or sulphur oxide (SOx), for example (e.g. calculation of gas concentration). In addition, the gas analyzer may be capable of measuring volatile organic compound (VOC) such as acetone, ethanol, toluene, benzene, or freon.

The gas analyzer described above may or may not be connected to the analyzer 100 via the network in the analysis systems 200a and 200b. If it is connected via the network, the control unit 9 of the analyzer 100 can obtain the data obtained by the gas analyzer, via the network so as to store the same in the storage unit 92 or the like. Other than that, the gas analyzer described above may be connected to an analog input unit (not shown) of the analyzer 100, for example. In this case, the gas analyzer outputs the measurement data as an analog signal to the analyzer 100. The control unit 9 of the analyzer 100 converts (e.g. A/D converts) the analog signal input from the gas analyzer into numerical data, and the numerical data can be stored as the measurement result in the storage unit 92 or the like. Further, instead of the structure in which the gas analyzer can communicate with the analyzer 100, it may be possible to adopt a structure in which the measurement data of the gas analyzer is stored in a storage medium device (such as a USB memory, an SD memory, an optical disc, or a small hard disk), and the analyzer 100 can obtain the measurement data from the storage medium device.

In addition, in the analysis system 200b including the server 101, the server 101 may obtain the measurement result from the gas analyzer via the network, an analog input terminal, and/or the storage medium device, so as to store the measurement result. The server 101 may provide the measurement result from the gas analyzer to each analyzer 100.

As described above, by further using the measurement data from the gas analyzer and the analysis result of ions to be a gaseous substance that can be contained in the fine particulate matter FP, the source of fine particulate matter FP can be more accurately estimated.

In addition, the server 101 may obtain phenomenon occurrence information (such as weather statistics information, event information, and/or traffic information (e.g. congestion information)) described later in the fourth embodiment from an external server or the like and to store the information, and may transmit the phenomenon occurrence information to the analyzer 100 according to a request from the analyzer 100. Alternatively, the analyzer 100 may access the server 101 so as to obtain necessary phenomenon occurrence information.

The server 101 may be a cloud server that stores various data and settings for the individual analyzers 100. In this case, each analyzer 100 may access the cloud server as the server 101 so as to obtain necessary data, setting, or the like from the server 101. In this case, the storage unit 92 of the analyzer 100 may have a minimum storage volume necessary for operating its program and the like.

Further, the server 101 may execute the analysis using the above-mentioned data collected from each analyzer 100. In addition, the server 101 may notify the analysis result and/or notify that it is different from a steady state, by means of email or a message on a Web page that can be obtained by accessing the server 101, for example.

The control unit 9 of each analyzer 100 may have the function of the server 101 described above. In other words, one certain control unit 9 may not only obtain data of another control unit 9 from the control unit 9 of another analyzer 100, but also obtain the weather statistics information, the event information, and/or the traffic information described above from the cloud server or an external server, and/or obtain measurement data of another type of analyzer such as a gas analyzer in the analysis system 200a or 200b. The control unit 9 may obtain data owned by another control unit 9, the weather statistics information, the event information, the measurement data obtained by the another type of analyzer, and the like via the network, or obtain them from a user using a storage medium device (such as a USB memory, an SD memory, an optical disc, or a small hard disk).

3. Third Embodiment

In the first embodiment described above, the source-related signal output unit 95 estimates the source of fine particulate matter FP and outputs the estimation result on the display 97. Other than that, a source-related signal output unit 95' according to the third embodiment may output an alarm (such as a signal for turning on an alarm lamp or a signal for generating alarm sound), when the collected fine particulate matter FP becomes a state different from the "steady state".

It should be noted that the structure of the analyzer 100 except for the source-related signal output unit 95' is the same as that in the first embodiment, and hence description thereof is omitted.

The "steady state" described above means a state where the mass concentration of the collected fine particulate matter FP, and/or the element analysis result are within a certain reference range. Therefore, the source-related signal output unit 95' according to the third embodiment outputs an alarm, if there is a "difference" between reference data (steady data) related to the fine particulate matter FP and measured mass concentration and the element analysis result of the collected fine particulate matter FP (measured data) (in other words, if the measured data is not similar to the steady data).

For example, an average value of the mass concentration and the element analysis result (e.g. element content) of the fine particulate matter FP collected and measured by the analyzer 100 continuously (e.g. for approximately one month) can be used as the steady data to be compared with the measured mass concentration and the element analysis result.

Other than that, it is also possible to use a measured value of the mass concentration and the element analysis result of the collected fine particulate matter FP in a particular factory, a measured value by the analyzer 100 of the mass concentration and the element analysis result of the standard substance, or the like.

For instance, it is supposed that the steady data including the element content and the mass concentration of elements a, b, c, and d recorded on the top row in FIG. 7 (obtained in advance and stored in the storage unit 92) are obtained.

In this case, the source-related signal output unit 95' performs multivariate analysis (e.g. principal component analysis, factor analysis, or cluster analysis) such as x-square determination between the steady data and the measured data (of the element content and the mass concentration of the elements a, b, c, and d) obtained by the analyzer 100 every predetermined time, for example, and if the determination result is a predetermined value or less (0.6 or less in the example of FIG. 7), the source-related signal output unit 95' determines that the currently obtained measured data is different from the steady state.

The steady data and the measured data described above may be, for example, component concentration or gas concentration of other than the elements a to d, other than the element content and the mass concentration. In this case, the steady data and/or the measured data may be included in the correlation data D. In addition, the data may be numerical data or image data other than physical quantity data such as concentration or content. Specifically, the data may be spectrum data, or a degree of coincidence between spectrum data of the steady data and spectrum data of the measured data, or image data of the filter, or color information obtained by analyzing the image data.

The above-mentioned predetermined value as criteria for determining whether or not the currently obtained measured data is different from the steady state may be adjustable. In this way, with respect to difference between the steady data and the measured data, "sensitivity" of determination that the measured data is different from the steady state can be adjusted. For instance, when the predetermined value is adjusted to be larger, it is possible to determine that the measured data is different from the steady state, even if the measured data is slightly deviated from the steady data (or if one of parameters included in the measured data is deviated from one corresponding parameter value of the steady data, for example).

FIG. 7 shows an example of the steady data and the measured data.

When determining that the measured data is different from the steady state, the source-related signal output unit 95' shows a display indicating that the measured data is different from the steady data on the display 97, outputs a signal for turning on the alarm lamp, or outputs a signal for generating the alarm sound, for example.

Alternatively, it may output a signal for notifying the alarm to another apparatus connected via the network.

As the source-related signal output unit 95' generates the alarm when the measured data different from the steady state is obtained, the user can be notified that a state different from a normal state has occurred when the fine particulate matter FP from a different source is collected in the analyzer 100, for example.

4. Fourth Embodiment

In the first embodiment described above, the correlation data D indicates the correlation among the elements contained in the fine particulate matter FP, the mass concentration of the fine particulate matter FP, and/or the wind direction data. However, it is possible to associate the correlation data D with other data. Structures and functions of the components of the analyzer 100 are the same as those in the first to third embodiments, and hence the description thereof is omitted.

For instance, in addition to the data described above, the correlation data D may include phenomenon occurrence information related to a phenomenon that has occurred around the position where the analyzer 100 is disposed, and may indicate a correlation between the phenomenon occurrence information and the data described above. The phenomenon occurrence information includes the weather statistics information, the event information, and/or the traffic information (congestion information), for example. The weather statistics information is a set of data related to weather (wind speed, air temperature, humidity, and the like) at a particular spot, for example, and can be obtained from the government office of each country handling weather information (Meteorological Agency in Japan). For instance, the weather statistics information for the spot where the analyzer 100 is disposed is obtained from the government office and stored in the storage unit 92 of the control unit 9 and/or in the server 101. Alternatively, the control unit 9 and/or the server 101 may access a predetermined server of the government office via the Internet so as to download the weather statistics information as necessary.

The event information is information related to occurrence of event such as volcanic eruption, launch of fireworks, and the like. The information related to occurrence of volcanic eruption can be obtained from the government office that handles the weather information, for example. The information related to launch of fireworks can be input by a user who has known about the information, using the control unit 9 and/or the server 101, for example. Other than that, the information related to occurrence of an event such as volcanic eruption or launch of fireworks may be downloaded by the control unit 9 and/or the server 101 as necessary via the Internet.

Other than that, as the event information, there are information on a planned pasturage in a cattle farm near the position where the analyzer 100 is disposed, information related to navigation of a ship, or the like.

The traffic information is, for example, information related to traffic of vehicles, such as congestion information in a road. The traffic information may be obtained from a server of an organization providing congestion information or the like, for example, via a network. Alternatively, the traffic information may be obtained and stored in the storage medium device in advance, so that the traffic information can be transferred from the storage medium device to the server 101 and/or the control unit 9.

As the phenomenon occurrence information is included in the correlation data D, the control unit 9 can change the conditions of measurement of fine particulate matter FP and/or the analysis algorithm by the analyzer 100 to optimized ones for the occurred event. For instance, the settings of the measurement conditions and/or the analysis algorithm corresponding to the occurred phenomenon are stored in the storage unit 92 in advance. When the control unit 9 and/or the server 101 detects that a predetermined phenomenon has occurred, the measurement conditions and/or the analysis algorithm corresponding to the predetermined phenomenon are read from the storage unit 92 so that the setting for the analyzer 100 can be made.

Alternatively, the control unit 9 and/or the server 101 may learn which measurement conditions and/or analysis algorithm are optimal for the occurred phenomenon. In this way, the control unit 9 and/or the server 101 after the learning can automatically set optimal measurement conditions and/or analysis algorithm to the analyzer 100 by inputting information related to the occurred phenomenon.

As shown in the second embodiment, when the analyzer 100 is connected to the server 101 in a communicable manner, the server 101 may change the measurement conditions and/or analysis algorithm of each analyzer 100 based on the correlation data D including the phenomenon occurrence information, and may send a signal indicating the change to the analyzer 100.

For instance, if a volcanic eruption occurs, the concentration of chemical compounds containing mercury (Hg) and sulfur (S) in the atmosphere is changed. In this case, for example, in order to optimize the measurement conditions for measuring high concentration mercury and sulfur, the analysis algorithm (quantitative algorithm) is changed. Other than that, for example, an X-ray filter (e.g. a primary X-ray filter provided to the X-ray source 71 and/or a secondary X-ray filter provided to the detector 73) of the analyzing unit 7 can be replaced with ones corresponding to high concentration mercury and sulfur, and/or a voltage for generating an electron beam from the X-ray source 71 can be changed.

In addition, for example, when a volcanic eruption occurs, fine volcanic ash is generated in large quantity. Therefore, for example, when a volcanic eruption occurs, dwell time of the collection filter 1 in the collection unit 3 is set shorter than normal time (e.g. one hour), and hence clogging of the collection filter 1 can be avoided.

On the other hand, if launch of fireworks occurs, chemical compounds containing an element having a flame reaction such as strontium (Sr) in particular are generated in large quantity. Therefore, in this case, the measurement conditions and/or analysis algorithm optimized for the high concentration strontium (element having a flame reaction) can be used.

Other than that, if there is a possibility that chemical compound containing arsenic (As) and/or lead (Pb) will increase, the measurement conditions and/or analysis algorithm are changed to ones optimized for the measurement of high concentration arsenic and/or lead.

In addition, when a certain characteristic data is obtained, the control unit 9 and/or the server 101 may know from the learning that the data is generated from a particular phenomenon.

For instance, when the analyzer 100 has obtained the characteristic data, the control unit 9 and/or the server 101 obtains the phenomenon occurrence information when the characteristic data is obtained. After that, the control unit 9 and/or the server 101 inputs the characteristic data and the phenomenon occurrence information (e.g. weather condition, occurred event, and/or traffic information) when the characteristic data is obtained, as learning data. The corresponding phenomenon occurrence information when the characteristic data is obtained may be designated and input by a user, or a database in which the phenomenon occurrence information and the characteristic data are associated with each other may be used, so that the phenomenon occurrence information corresponding to the characteristic data obtained this time by the control unit 9 and/or the server 101 can be retrieved and assigned. In this way, the control unit 9 and/or the server 101 can form a learning model inside that enables to identify which type of phenomenon (such as an event, congestion, or a special weather state) has occurred, when characteristic measurement data is input.

After the learning described above has enabled to correctly recognize the phenomenon occurred from the input characteristic data with a certain degree of accuracy, the control unit 9 and/or the server 101 calculates a degree of correlation between the characteristic data and the particular phenomenon (e.g. probability of occurrence of a particular phenomenon when certain characteristic data is input) using the learning model formed inside.

After that, if the calculated degree of correlation is a predetermined threshold value or higher, for example, the control unit 9 and/or the server 101 issues a notification indicating that a phenomenon in which a degree of the correlation with the characteristic data is a predetermined threshold value or higher, has occurred, as a source-related signal. Alternatively, when the calculated degree of correlation becomes the threshold value or higher continuously a predetermined number of times, the phenomenon in which the degree of correlation with the characteristic data is a threshold value or higher continuously may be notified as the source-related signal. The threshold value may be automatically calculated by the learning model formed through the learning described above. In other words, in the learning described above, the learning model capable of automatically calculating the threshold value may be formed, or a user may set the threshold value.

In this way, the control unit 9 and/or the server 101 can output the occurrence of the particular phenomenon and/or a source of the phenomenon as the source-related signal, based on the measurement data obtained from the analyzer 100 and/or another type of analyzer.

In addition, the control unit 9 and/or the server 101 may know through the leaning that, even if the characteristic mass concentration measurement result and/or the characteristic element analysis result that are usually abnormal are obtained, in some installation locations, this characteristic data is obtained when the particular phenomenon occurs, and is regarded as the steady data.

For instance, if the installation location of the analyzer 100 is inside a port facility or near the port facility, the characteristic data obtained when a ship passes by can be the steady data. Fine particulate matter FP in the exhaust gas of the ship usually contains vanadium and chromium. Therefore, when the ship passes by, in the element analysis result, the characteristic data indicating that high concentrations of vanadium and chromium are detected is obtained.

In this case, for example, when data that is usually abnormal because higher concentrations of vanadium and chromium are detected is obtained, and at the timing when this data is obtained, it is determined that a ship is passing near the position where the analyzer 100 is disposed, and/or the exhaust gas of the passing ship reaches the installation location of the analyzer 100 according to the wind direction and/or the weather, the data in which high concentrations of vanadium and chromium are detected is regarded as the steady data.

As to the setting described above, for example, the user who is informed by the analyzer 100 and/or the server 101 that the obtained data is abnormal can teach the control unit 9 and/or the server 101 that the abnormal data is actually the steady data, using an input device or the like. In addition, in this teaching, not only the obtained data but also phenomenon occurrence information (e.g. event information indicating passing of a ship (exhaust gas of a ship), weather condition (weather statistics information), and the like) may be taught as the learning data.

Alternatively, when the analyzer 100 obtains the data in which vanadium and chromium are detected at high concentrations, the control unit 9 and/or the server 101 may refer to the phenomenon occurrence information (e.g. information related to ship navigation and/or weather statistics information), so as to automatically learn that the obtained abnormal data is the steady data, if the condition when the abnormal data is obtained causes the occurrence of a particular phenomenon (e.g. a ship passage, and/or a weather condition when the data is obtained causes the exhaust gas of the ship to reach the position where the analyzer 100 is disposed), by means of machine learning, for example. In addition, along with this, the control unit 9 and/or the server 101 may automatically learn that the abnormal data is obtained when a particular phenomenon occurs (e.g. when a ship is passing by).

In this way, the control unit 9 and/or the server 101 after the learning can automatically determine that the data in which vanadium and chromium are detected at high concentrations is the steady data, i.e. the date obtained when a particular phenomenon occurs (e.g. when a ship passing by). In addition, when the data in which vanadium and chromium are detected at high concentrations (abnormal data) is obtained, the control unit 9 and/or the server 101 can output a signal notifying the occurred phenomenon (e.g. a signal notifying that the exhaust gas is exhausted from a ship existing (or passing) in a particular position), as the source-related signal.

Further, the control unit 9 and/or the server 101 may calculate a flow of the air by the simulation based on weather statistics information and a state of the upper air, so as to predict how the fine particulate matter FP collected by the collection filter 1 moves based on a result of the simulation (e.g. a trajectory analysis is used). In this way, for example, when the particular fine particulate matter FP is collected in the analyzer 100, it is possible to predict which path the particular fine particulate matter FP moves along before and after the collection.

5. Fifth Embodiment

(1) Target Element Quantification Method in Fifth Embodiment

In the fifth embodiment, when performing the element analysis of the fine particulate matter FP containing a plurality of elements, the overlap of the spectrum peaks of weak fluorescent X-rays is also considered, so as to obtain a more correct element analysis result. In the fifth embodiment, the structures and functions of components of the analyzer 100 are the same as those in the first to fourth embodiments except that the overlap of spectrum peaks is considered, and hence description thereof is omitted.

When performing the element analysis of a substance containing a plurality of elements by detecting fluorescent X-rays, the spectrum peaks of a certain particular element by fluorescent X-rays may overlap with spectrum peaks of another element. For instance, if the position where the analyzer 100 is disposed is close to a cattle farm, and if pasturage is occurred in the cattle farm, compounds containing bromine (Br) may be generated. It is known that some of spectrum peaks of bromine overlap with some of spectrum peaks of aluminum (Al). Therefore, if the analyzer 100 disposed in a vicinity of a source of bromine such as a cattle farm performs the element analysis of aluminum, the quantification of aluminum (particularly in low concentration) may not be performed accurately. In addition, it is known that some of spectrum peaks of lead overlap with some of spectrum peaks of arsenic.

If spectrum peaks overlap with each other, even in part, content (concentration) of a particular element may be calculated as different from actual content (concentration). This calculation error of the element content due to the overlap of spectrum peaks becomes conspicuous in particular when the content of the element to be analyzed is small.

Therefore, in this embodiment, the control unit 9 and/or the server 101 perform the qualitative element analysis (identification of element) and the quantification (calculation of element concentration) by taking an influence of the overlap of spectrum peaks in consideration. Specifically, using the reference spectrum of fluorescent X-rays of an element considered to be contained in the fine particulate matter FP, the spectrum that actually matches the measured spectrum is generated, and the content (concentration) of the element is calculated based on the intensity of the reference spectrum included in the generated spectrum.

In order to perform the element quantification described above, in this embodiment, a spectrum obtained from a substance containing a known concentration of an element to be measured (referred to as a reference substance) (the spectrum referred to as the reference spectrum) is stored in the storage unit 92. The reference spectrum is obtained by detecting fluorescent X-rays of the substance containing the known concentration of the element to be measured, using the analyzing unit 7.

Figure 8A:
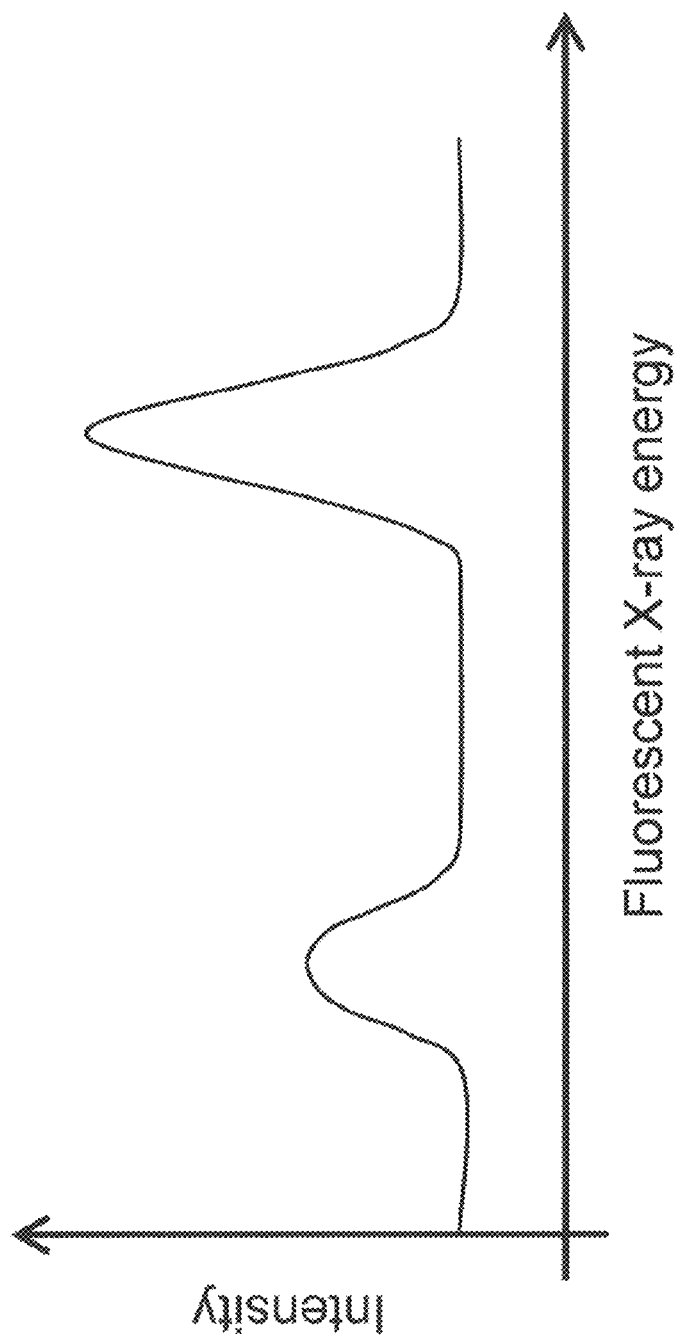
FIG. 8A is a graph showing one example of a measured profile.

The element analysis according to this embodiment is specifically described below. In the following description, it is supposed that the spectrum of fluorescent X-rays (measured profile MP) as shown in FIG. 8A is obtained from the fine particulate matter FP. FIG. 8A shows one example of the measured profile.

Figure 8B:
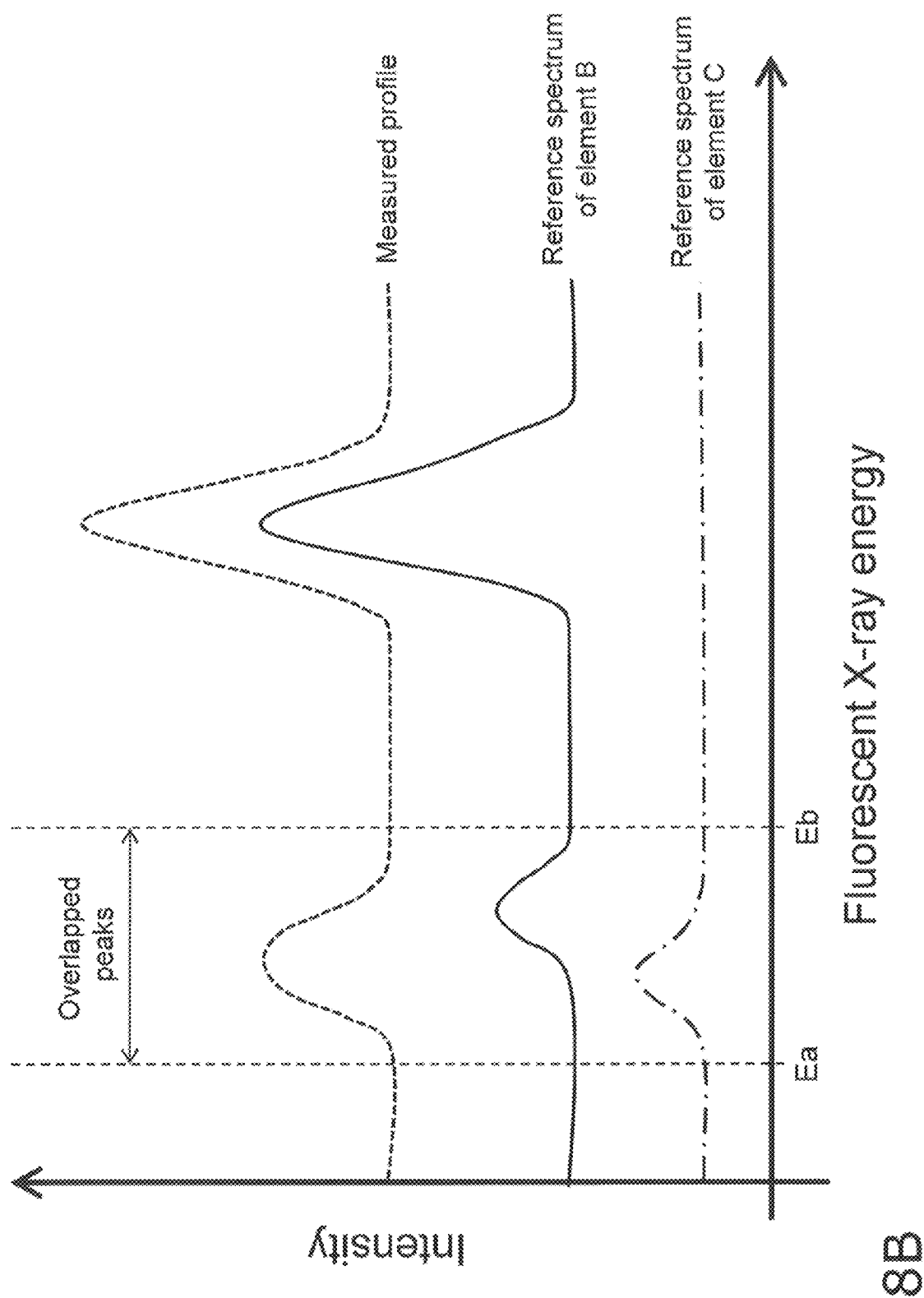
FIG. 8B is a graph showing one example of reference spectra.

In addition, it is supposed that the fine particulate matter FP contains element B and element C. Further, it is supposed that the element B and the element C have spectra of fluorescent X-rays (reference spectra) as shown in FIG. 8B. FIG. 8B shows one example of the reference spectra. In FIG. 8B, the reference spectrum of the element B is shown with a solid line, and the spectrum of the element C is shown with a dot-dashed line.

As shown in FIG. 8B, the spectrum peak in the fluorescent X-ray energy between Ea and Eb of the reference spectrum of the element B and the spectrum peak in the same energy range of the reference spectrum of the element C are close to each other in the energy position. As a result, the measured profile MP (shown with a broken line in FIG. 8B) exists in the state where the two spectrum peaks are not separated in the above-mentioned energy range.

For this reason, when content of an element in the fine particulate matter FP is calculated using the measured profile MP, the calculated content (concentration) is larger than the real content. This influence of the overlapped spectrum peaks becomes conspicuous particularly in the case of small content of the element B and/or the element C.

Figure 9:
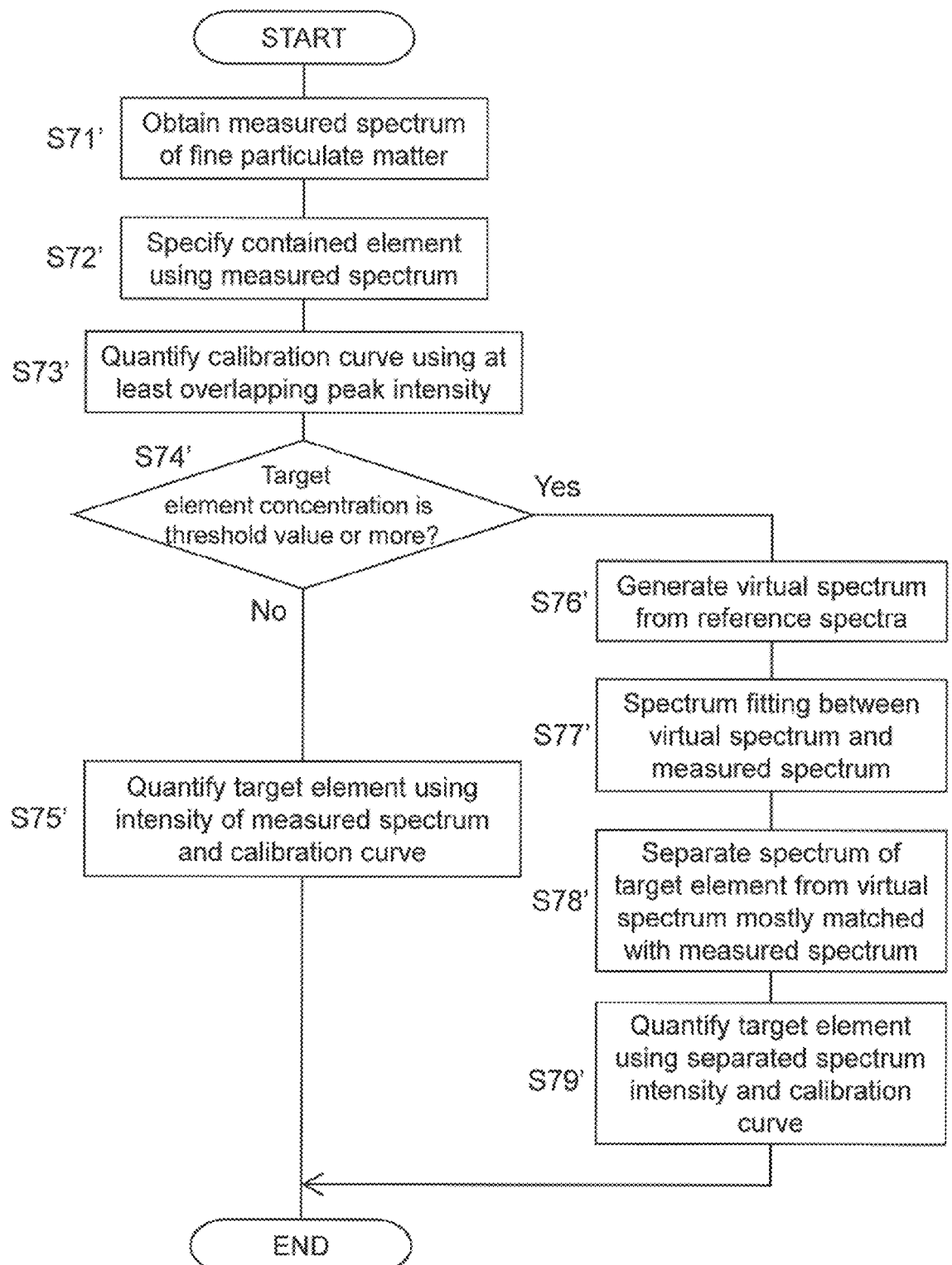
FIG. 9 is a flowchart showing an element analysis method according to a fifth embodiment.

Therefore, in this embodiment, according to the flowchart shown in FIG. 9, the quantification (content calculation) of element contained in the fine particulate matter FP is performed. FIG. 9 is a flowchart showing an element analysis method according to the fifth embodiment.

After obtaining the measured profile MP of the fine particulate matter FP collected by the collection filter 1 (Step S71'), the control unit 9 and/or the server 101 specifies the element contained in the fine particulate matter FP based on peak positions of the measured profile MP (Step S72').

Next, the control unit 9 and/or the server 101 performs the quantification of the specified element using at least the intensity of the spectrum peak of the measured profile MP within the energy range in which spectrum peaks are overlapped in the spectra of elements specified in Step S72' (Step S73'). In other words, all spectrum peaks corresponding to the specified elements within the energy value contained in the measured profile MP may be used for the quantification of the element, or only the overlapped spectrum peaks may be used for the quantification of the element.

If the quantification result of the element B and/or the element C in Step S73' is within the range of the element content assumed to be contained in the fine particulate matter FP, i.e. if the quantification result is smaller than a predetermined threshold value ("No" in Step S74'), the intensity of the measured profile MP and a calibration curve indicating a relationship between the content of each element and the spectrum intensity are used to perform the quantification of the element B and/or the element C (Step S75'). The intensity of the measured profile MP to be used for the quantification using the calibration curve may be the integrated intensity or may be the peak intensity at a particular peak position.

On the other hand, if the quantification result in Step S73' is the predetermined threshold value or higher ("Yes" in Step S74'), the spectra of the element B and the element C are separated from the measured profile MP, and the intensity of the separated spectrum of each element is used to perform quantification of each element.

Specifically, the reference spectrum of the element B and the reference spectrum of the element C are first read from the storage unit 92, and the two reference spectra are added to generate a virtual spectrum (Step S76'). The virtual spectrum is generated by increasing or decreasing intensity of the entire or some of the reference spectra. Increasing or decreasing the intensity of reference spectrum virtually corresponds to increasing or decreasing the content (concentration) of a target element.

Among (a plurality of) virtual spectra generated in Step S76', a virtual spectrum mostly matched with the measured profile MP is selected (spectrum fitting) (Step S77'). Specifically, for example, a virtual spectrum having the minimum sum of squares of difference between itself and the measured profile MP is selected (the least squares method).

Next, the spectrum of the element B and the spectrum of the element C included in the virtual spectra selected in Step S77' are calculated (Step S78'). For instance, an increasing/decreasing ratio of the intensity of the reference spectrum of the element B when generating the virtual spectrum mostly matched with the measured profile MP is multiplied to the intensity of the reference spectrum of the element B, and hence the spectrum of the element B can be calculated. In the same manner, an increasing/decreasing ratio of the intensity of the reference spectrum of the element C when generating the virtual spectrum mostly matched with the measured profile MP is multiplied to the intensity of the reference spectrum of the element C, and hence the spectrum of the element C can be calculated.

In this way, the spectrum of the element B and the spectrum of the element C can be separated from the measured profile MP.

After the spectrum of each target element is separated, intensity of the spectrum separated for the element B and a calibration curve indicating a relationship between content of the element B and the spectrum intensity are used, so as to perform quantification of the element B (Step S79'). The intensity to be used for the quantification using the calibration curve may be the integrated intensity or may be the peak intensity at a particular peak position.

In the same manner, the intensity of the spectrum separated for the element C and a calibration curve indicating a relationship between content of the element C and the spectrum intensity are used, so as to perform the quantification of the element C.

In another embodiment, the quantification of a target element may be performed by multiplying an increasing/decreasing ratio of the intensity of the reference spectrum of the target element when generating the virtual spectrum mostly matched with the measured profile MP, by the content of the target element contained in the substance used for obtaining the reference spectrum. It is because the intensity of the spectrum usually has correlation with the content (concentration) of the target element.

By performing the element analysis according to the flowchart shown in FIG. 9, the qualification and the quantification of the target element can be performed using the intensity of the measured profile MP, if the influence of the overlap of spectrum peaks included in the measured profile MP is small.

On the other hand, if the influence of the overlap of spectrum peaks included in the measured profile MP is so large that the resulted content is unexpectedly large when the quantification is performed using the measured profile MP, the spectra of target elements are separated from the measured profile MP to cancel the overlap of the spectrum peaks, and then the quantification of the target element can be performed using the separated spectra. As a result, the influence of the overlap of the spectrum peaks can be minimized to accurately perform the quantification of the target element.

(2) Variations

As a variation of this embodiment, the following structure may be adopted. The control unit 9 and/or the server 101 learns the learning data, which include the spectrum of the substance containing a plurality of target elements at known contents (concentrations), the known contents, and other known information (e.g. measurement condition), so that a learned model, which enables to calculate the qualification and quantification result of each target element from unknown spectrum (measured profile MP), is formed in the control unit 9 and/or the server 101.

In this variation, it is preferable to obtain the spectrum to be input to the control unit 9 and/or the server 101 for the learning, by using the substance containing the target element at low content (low concentration). In this way, the learning can be performed using the data strongly affected by the overlap of spectrum peaks. As a result, it is possible to form an appropriate learned model that enables the accurate qualification and quantification of the target element having low content (low concentration).

After forming the learned model that enables the qualification and quantification with a certain degree of accuracy, the control unit 9 and/or the server 101 can obtain the qualification result and the quantification result of the target element as an output from the learned model, by inputting to the learned model the measured profile MP obtained by the analyzer 100 and other known information (measurement condition) when the measured profile MP is obtained.

In another embodiment, using the spectrum after the qualification and quantification using a learned model having a certain degree of accuracy, the learned model may be further learned. In this case, it may be possible to input data for learning which is a result of measuring the amount of element contained in the fine particulate matter FP whose spectrum has been obtained after the qualification and quantification, by other method (such as a high frequency inductively coupled plasma (ICP) method).

By further learning the learned model, the learned model after the learning enables the more accurate qualification and quantification of the target element.

6. Other Embodiments

Although a plurality of embodiments of the present invention are described above, the present invention is not limited to the embodiments described above and can be variously modified within the scope of the invention without deviating from the spirit thereof. In particular, the plurality of embodiments and variations described in this specification can be arbitrarily combined as necessary.

Figure 3:
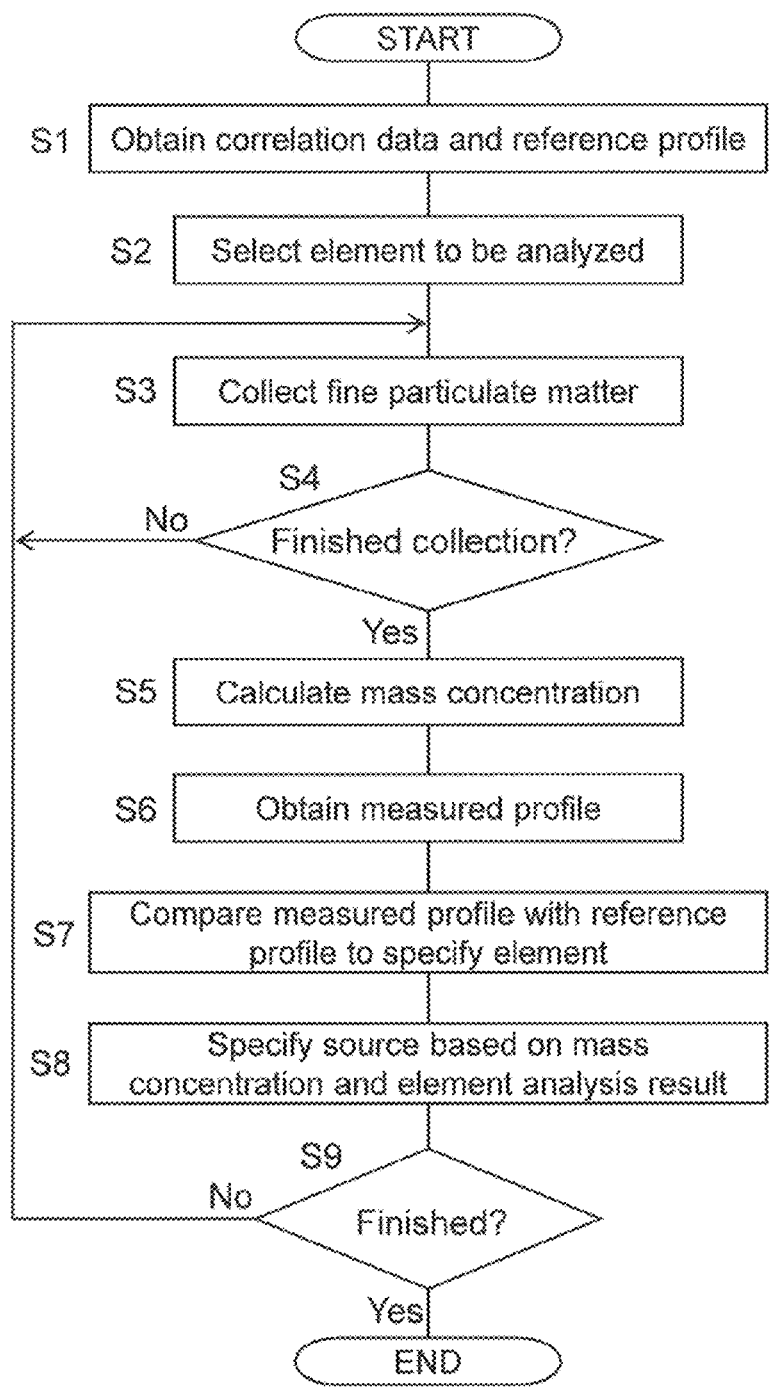
FIG. 3 is a flowchart showing an analysis operation for estimating a source of fine particulate matter.

For instance, the order and/or process contents of the steps shown in the flowchart of FIG. 3 may be changed without deviating from the spirit of the invention. For instance, the calculation of the mass concentration in Step S5 and the element analysis in Steps S6 to S7 may be exchanged in order. In addition, the first to fifth embodiments described above can be arbitrarily combined as necessary.

(A) Other Embodiment Related to Reference Profile

The reference profile P may be constituted of a plurality of fluorescent X-ray profiles obtained successively in a predetermined period. For instance, the reference profile P in which the source-specified particulate matter is yellow sand has a peak corresponding to sulphur (S) in the fluorescent X-ray profile obtained in an early stage, and also has a peak corresponding to silicon (Si) in the fluorescent X-ray profile obtained after a predetermined time.

In this case, the element analysis unit 93 compares the reference profile P with a plurality of measured profiles MP obtained successively, for example. If the temporal variation of peaks (elements) in the plurality of measured profiles MP obtained successively is substantially the same as the temporal variation of peaks (elements) in the reference profile P, it can be determined that the collected fine particulate matter FP is from the same source (contains the same elements) as the source-specified particulate matter associated with the reference profile P.

(B) Other Embodiment Pertaining to Measured Profile

The element analysis unit 93 may average the fluorescent X-ray profiles of a plurality of fine particulate matters FP obtained successively, so as to calculate the measured profile MP.

INDUSTRIAL APPLICABILITY

The present invention can be widely applied to analyzers for analyzing particulate matter existing in a measurement space.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An analysis system comprising:
an analyzer comprising:
a mass concentration measuring unit that measures mass concentration of particulate matter;
an element analysis unit that analyzes an element contained in the particulate matter, and
a source-related signal output unit configured to estimate a source of the particulate matter, based on a mass concentration measurement result by the mass concentration measuring unit, an element analysis result by the element analysis unit about the element contained in the particulate matter, and a correlation between the element contained in the particulate matter and the mass concentration of the particulate matter.

2. The analysis system according to claim 1, wherein the analyzer further comprises a storage unit that stores correlation data indicating the correlation between the element contained in the particulate matter and mass concentration of the particulate matter, wherein
the source-related signal output unit estimates the source of the particulate matter based on the correlation data, the element analysis result, and the mass concentration measurement result.

3. The analysis system having an analyzer according to claim 2, wherein
the correlation data further includes wind direction data related to a correlation between the element contained in the particulate matter and/or the mass concentration of the particulate matter and the wind direction, and
the source-related signal output unit estimates the source of particulate matter based on the wind direction data.

4. The analysis system according to claim 1, wherein the analyzer obtains phenomenon occurrence information related to an occurred phenomenon, and sets measurement conditions and/or analysis algorithm based on the obtained phenomenon occurrence information.

5. The analysis system according to claim 1, wherein the analyzer further comprises an element selection unit that selects an element to be analyzed by the element analysis unit.

6. The analysis system according to claim 5, wherein when a determination is made that a currently selected element is not contained in the particulate matter, the element selection unit selects an element different from the currently selected element, as the element to be analyzed.

7. The analysis system according to claim 1, wherein the element analysis unit analyzes the element contained in the particulate matter based on comparison between a measured profile and a reference profile,
the measured profile indicating a relationship between energy of fluorescent X-rays generated from the particulate matter and intensity of the same, and
the reference profile indicating a relationship between energy of the fluorescent X-rays generated from a source-specified particulate matter whose source is specified and intensity of the same.

8. The analysis system according to claim 1, wherein the source-related signal output unit compares steady data related to the element contained in the particulate matter and mass concentration in a steady state with measured data of the element analysis result and the mass concentration, and if it is determined that the measured data is not similar to the steady data, the source-related signal output unit outputs a signal for alarm.

9. The analysis system according to claim 1, further comprising:
a collection filter having a collection area capable of collecting the particulate matter, the collection filter moving in the length direction so that the collection area is moved from a first position to a second position; and
a collection unit disposed corresponding to the first position, so as to allow the collection area at the first position to collect the particulate matter, wherein
the mass concentration measuring unit measures mass concentration of the particulate matter collected in the collection area at the first position, and
the element analysis unit analyzes the element contained in the particulate matter collected in the collection area after moving from the first position to the second position.

10. The analysis system according to claim 1, further comprising:
a server capable of communicating with the analyzer and an external device, wherein
the server and/or a control unit of the analyzer obtain phenomenon occurrence information related to an occurred phenomenon, and set measurement conditions and/or analysis algorithm of the analyzer based on the obtained phenomenon occurrence information.

11. The analysis system of claim 1, wherein the system comprises a plurality of analyzers.

12. An analysis method comprising the steps of:
measuring mass concentration of particulate matter;
analyzing an element contained in the particulate matter; and
estimating a source of the particulate matter, based on a mass concentration measurement result, an element analysis result about the element contained in the particulate matter, and a correlation between the element contained in the particulate matter and the mass concentration of the particulate matter.

13. A program for configuring a computer to execute an analysis method comprising the steps of:
measuring mass concentration of particulate matter;
analyzing an element contained in the particulate matter; and
estimating a source of the particulate matter, based on a mass concentration measurement result, an element analysis result about the element contained in the particulate matter, and a correlation between the element contained in the particulate matter and the mass concentration of the particulate matter.

14. The analysis system of claim 1, wherein the source-related signal output unit is configured to monitor a change of the source of the particulate matter.

15. The analysis method of claim 12, further comprising the step of monitoring a change of the source of the particulate matter.

16. The program of claim 13, wherein the analysis method further comprises the step of monitoring a change of the source of the particulate matter.

* * * * *